(12) United States Patent
Suzuki et al.

(10) Patent No.: US 12,196,217 B2
(45) Date of Patent: Jan. 14, 2025

(54) TURBO FLUID MACHINE

(71) Applicant: KABUSHIKI KAISHA TOYOTA JIDOSHOKKI, Aichi (JP)

(72) Inventors: Junya Suzuki, Kariya (JP); Hidefumi Mori, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 64 days.

(21) Appl. No.: 18/090,768

(22) Filed: Dec. 29, 2022

(65) Prior Publication Data

US 2023/0265858 A1 Aug. 24, 2023

(30) Foreign Application Priority Data

Feb. 18, 2022 (JP) .................................. 2022-023506

(51) Int. Cl.
*F04D 29/10* (2006.01)
*F04D 17/10* (2006.01)
*F04D 25/06* (2006.01)

(52) U.S. Cl.
CPC ........... *F04D 29/102* (2013.01); *F04D 17/10* (2013.01); *F04D 25/06* (2013.01)

(58) Field of Classification Search
CPC ......... F04D 17/10; F04D 25/06; F04D 29/102
See application file for complete search history.

(56) References Cited

U.S. PATENT DOCUMENTS

| | | | | |
|---|---|---|---|---|
| 2017/0122339 A1* | 5/2017 | Sun | .......................... | F02B 37/14 |
| 2020/0263698 A1* | 8/2020 | Mori | ...................... | F04D 25/024 |
| 2020/0378276 A1* | 12/2020 | Ikeya | ....................... | F01D 25/32 |

FOREIGN PATENT DOCUMENTS

WO    WO2019/159744 A1    8/2019

OTHER PUBLICATIONS

Munson, B. R., Young, D. F., Okiishi, T. H. Fundamentals of Fluid Mechanics. (2006). Wiley. 5th Edition. p. 438 (Year: 2006).*

* cited by examiner

*Primary Examiner* — Connor J Tremarche
(74) *Attorney, Agent, or Firm* — Greenblum & Bernstein, P.L.C.

(57) ABSTRACT

A turbo fluid machine includes a housing having a motor chamber, a turbine chamber, a first shaft hole, and a second shaft hole; a drive shaft; and a sealing member that seals a gap between the motor chamber and the turbine chamber. The sealing member includes a first sealing member and a second sealing member that is located away from the first sealing member and between the first sealing member and the turbine chamber in an axial direction of the drive shaft. The drive shaft, the second shaft hole, the first sealing member, and the second sealing member cooperate to form a reservoir in which water contained in exhaust from a fuel cell is stored. The housing has a water discharge passage which is communicated with the reservoir and through which the water is discharged from the reservoir to an outside of the housing.

8 Claims, 3 Drawing Sheets

TURBO FLUID MACHINE

CROSS-REFERENCE TO RELATED APPLICATION

This application claims priority to Japanese Patent Application No. 2022-023506 filed on Feb. 18, 2022, the entire disclosure of which is incorporated herein by reference.

The present disclosure relates to a turbo fluid machine.

BACKGROUND ART

Domestic re-publication of PCT international publication for patent application No. WO2019159744 discloses a known turbo fluid machine. This turbo fluid machine includes a housing, an electric motor, an impeller, a turbine, a drive shaft, and a sealing member.

The housing has an impeller chamber, a turbine chamber, a motorchamber, a first shaft hole, and a second shaft hole. The impeller chamber is located away from the turbine chamber in the axial direction of the drive shaft. The motor chamber is located between the impeller chamber and the turbine chamber. The first shaft hole is located between the impeller chamber and the motor chamber, and communicated with the impeller chamber and the motor chamber. The second shaft hole is located between the motor chamber and the turbine chamber, and communicated with the motor chamber and the turbine chamber. The electric motor is accommodated in the motor chamber. The impeller is accommodated in the impeller chamber. The turbine is accommodated in the turbine chamber. The drive shaft is supported by the first shaft hole and the second shaft hole, and connects the electric motor, the impeller, and the turbine. The single sealing member is disposed between the second shaft hole and the drive shaft so as to seal a gap between the motor chamber and the turbine chamber.

The turbo fluid machine is connected to a fuel cell. The electric motor rotates the impeller, and the impeller compresses cathode gas with the rotation of the impeller so as to supply the cathode gas to the fuel cell. The fuel cell discharges exhaust to the turbine chamber. This rotates the turbine in the turbine chamber.

The exhaust from the fuel cell contains water produced during power generation by the fuel cell. If the produced water flows into the motor chamber through the second shaft hole, the water may cause short circuit in the electric motor. In this regard, the aforementioned turbo fluid machine is designed so that the sealing member prevents the water from flowing into the motor chamber through the second shaft hole. However, since the sealing member cannot completely seal the gap between the motor chamber and the turbine chamber, a single sealing member is not enough to prevent the water from flowing into the motor chamber. Accordingly, this known turbo fluid machine is not capable of suitably preventing short circuit in the electric motor due to the produced water.

The present disclosure, which has been made in light of the above-mentioned problem, is directed to providing a turbo fluid machine that is capable of suitably preventing short circuit in an electric motor due to water contained exhaust from a fuel cell.

SUMMARY

In accordance with an aspect of the present disclosure, there is provided a turbo fluid machine that includes: a housing, an electric motor, an impeller, a turbine, a drive shaft, and a sealing member. The housing has an impeller chamber, a turbine chamber, a motor chamber located between the impeller chamber and the turbine chamber, a first shaft hole located between the impeller chamber and the motor chamber and communicated with the impeller chamber and the motor chamber, and a second shaft hole located between the motor chamber and the turbine chamber and communicated with the motor chamber and the turbine chamber. The electric motor is accommodated in the motor chamber. The impeller is accommodated in the impeller chamber, and configured to compress cathode gas with rotation of the electric motor so as to supply the cathode gas to a fuel cell. The turbine is accommodated in the turbine chamber and rotated by exhaust from the fuel cell. The drive shaft is inserted through the first shaft hole and the second shaft hole, and connects the electric motor, the impeller, and the turbine. The sealing member is disposed between the second shaft hole and the drive shaft to seal a gap between the motor chamber and the turbine chamber. The sealing member includes a first sealing member and a second sealing member that is located away from the first sealing member and between the first sealing member and the turbine chamber in an axial direction of the drive shaft. The drive shaft, the second shaft hole, the first sealing member, and the second sealing member cooperate to form a reservoir in which water contained in the exhaust is stored. The housing has a water discharge passage which is communicated with the reservoir and through which the water is discharged from the reservoir to the outside of the housing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The present disclosure together with objects and advantages thereof, may best be understood by reference to the following description of the embodiments together with the accompanying drawings in which.

DETAILED DESCRIPTION OF EMBODIMENTS

The following will describe a first embodiment and a second embodiment of the present disclosure in detail with reference to the accompanying drawings. A turbo fluid machine according to a first embodiment and a second embodiment is mounted to a fuel cell vehicle (not illustrated), and connected to a fuel cell 300 illustrated in FIG. 1. The turbo fluid machine according to the first embodiment and the second embodiment cooperates with the fuel cell 300 to form a fuel cell system 500.

First Embodiment

Figure 1:
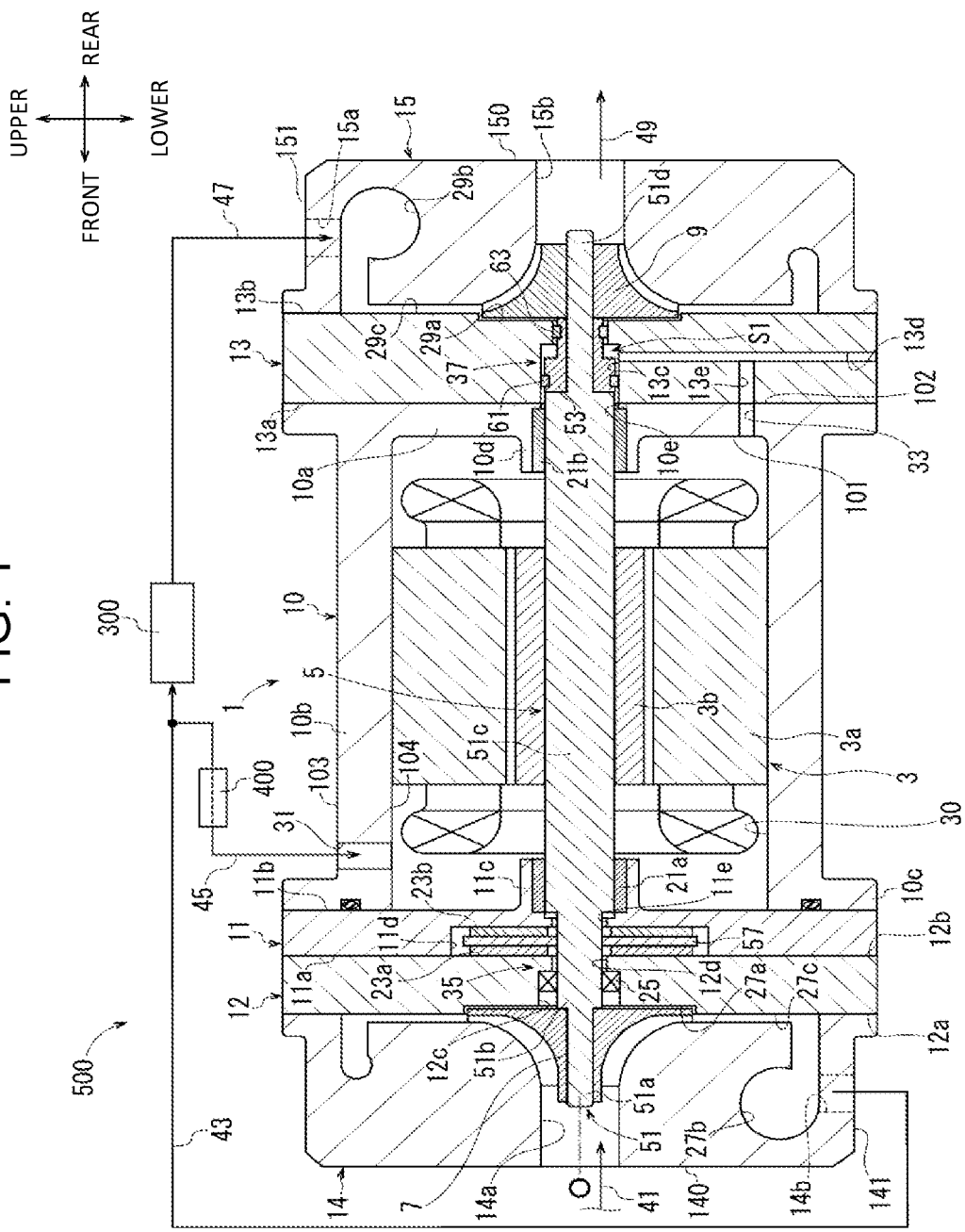
FIG. 1 is a sectional view of a turbo fluid machine according to a first embodiment.

As illustrated in FIG. 1, the turbo fluid machine according to the first embodiment includes a housing 1, an electric motor 3, a drive shaft 5, an impeller 7, a turbine 9, a first seal ring 61, and a second seal ring 63. In this embodiment, the first seal ring 61 and the second seal ring 63 cooperate to serve as the sealing member of the present disclosure as an example. The sealing member of the present disclosure includes a first sealing member and a second sealing member. Specifically, in this embodiment, the first seal ring 61 and the second seal ring 63 respectively serve as the first sealing member and the second sealing member of the present disclosure as an example.

Figure 2:
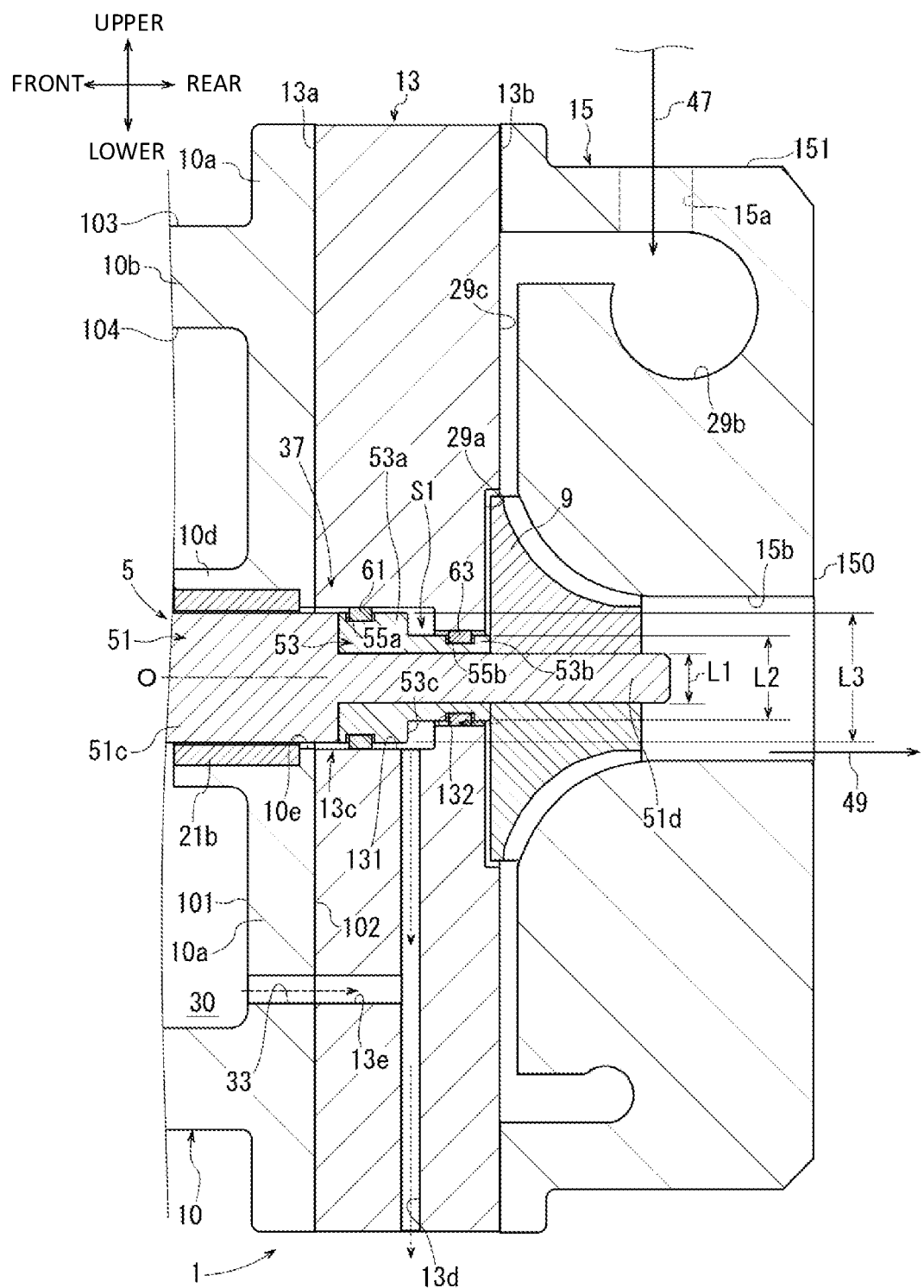
FIG. 2 is an enlarged sectional view of the turbo fluid machine according to the first embodiment, illustrating a main part including a reservoir.
Figure 3:
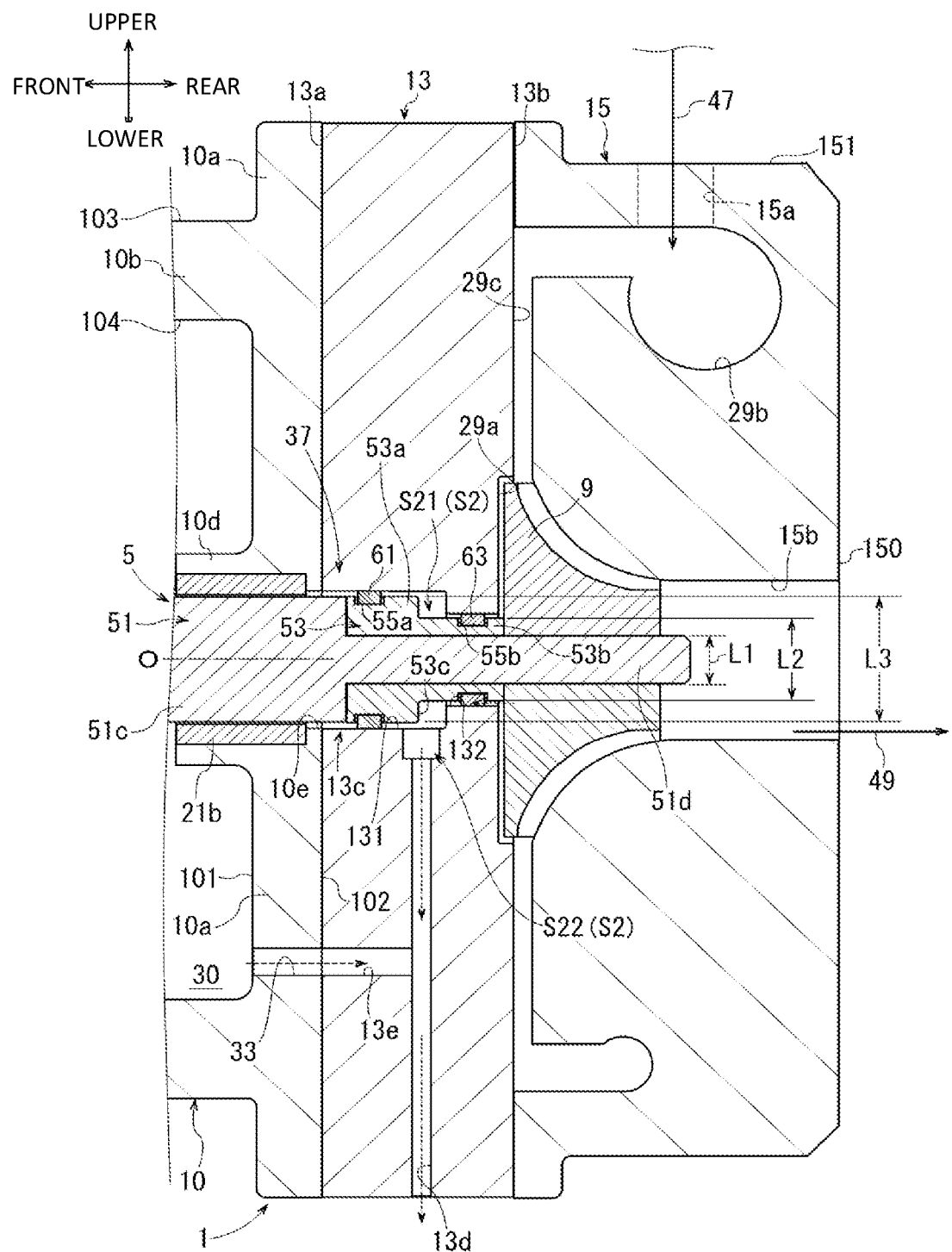
FIG. 3 is an enlarged sectional view of a turbo fluid machine according to a second embodiment, illustrating a main part including a reservoir.

In the embodiments, the front-rear direction and the up-down direction of the turbo fluid machine are indicated by the solid arrows in FIGS. 1-3. The front-rear direction serves as the axial direction of the drive shaft of the present disclosure as an example. The up-down direction is a direction in which the gravity acts on the housing 1, so that the gravity acts on the housing 1 from top to bottom. The front-rear direction and the up-down direction are at right angles to each other. The turbo fluid machine according to the embodiments is mounted to the fuel cell vehicle such that an axial direction of the drive shaft 5 corresponds to the front-rear direction of the turbo fluid machine. Accordingly, the gravity acts on the turbo fluid machine, including the housing 1, in a direction perpendicular to the axial direction of the drive shaft 5. The turbo fluid machine may be mounted at various postures depending on the fuel cell vehicle.

The housing 1 is made of aluminum alloy. The housing 1 includes a motor housing 10, a first plate 11, a second plate 12, a third plate 13, a compressor housing 14, and a turbine housing 15.

The motor housing 10 includes an end wall 10a and a peripheral wall 10b. The end wall 10a is located at a rear end of the motor housing 10, and extends in a radial direction of the motor housing 10, i.e., a radial direction of the housing 1. The end wall 10a has opposite surfaces, i.e., a first surface 101 and a second surface 102, which are oriented frontward and rearward, respectively. The second surface 102 forms the rear surface of the motor housing 10.

The peripheral wall 10b is integrally formed with the end wall 10a, has a cylindrical shape, and extends frontward from the end wall 10a. The peripheral wall 10b has an opening at a front end thereof. The end wall 10a and the peripheral wall 10b cooperate to form the bottomed-cylindrical motor housing 10. The peripheral wall 10b of the motor housing 10 has a supply passage 31. The supply passage 31 extends in the radial direction of the housing 1, and is opened on an outer peripheral surface 103 and an inner peripheral surface 104 of the peripheral wall 10b. The peripheral wall 10b has a flange portion 10c at a front end thereof. The flange portion 10c extends from the peripheral wall 10b in the radial direction of the motor housing 10.

The first plate 11 is located in front of the motor housing 10. The first plate 11 has a first front surface 11a and a first rear surface 11b respectively on the front side and the rear side of the first plate 11. The first plate 11 is connected to the flange portion 10c with the first rear surface 11b contacting the flange portion 10c. The opening of the peripheral wall 10b is closed by the first plate 11. The end wall 10a and peripheral wall 10b cooperate with the first rear surface 11b to define a motor chamber 30 in the motor housing 10. The motor chamber 30 is communicated with the supply passage 31. The motor chamber 30 is communicated with the outside of the housing 1 through the supply passage 31.

The first plate 11 includes a first boss 11c, a first recess 11d, and a first through hole 11e. The first boss 11c has a cylindrical shape and extends rearward from the first rear surface 11b into the motor chamber 30. A first radial bearing 21a is disposed inside the first boss 11c.

The first recess 11d is recessed rearward from the first front surface 11a. A first thrust bearing 23a and a second thrust bearing 23b are disposed inside the first recess 11d. The first through hole 11e is located at a center portion of the first plate 11 and formed through the first plate 11 in the front-rear direction. A front end of the first through hole 11e is communicated with the first recess 11d, and a rear end of the first through hole 11e is communicated with the first boss 11c. The first boss 11c, the first recess 11d, and the first through hole 11e are formed coaxially with each other.

The end wall 10a of the motor housing 10 includes a second boss 10d, a second through hole 10e, and a connecting passage 33. The second boss 10d has a cylindrical shape and extends frontward from the first surface 101 into the motor chamber 30. A second radial bearing 21b is disposed inside the second boss 10d. In this embodiment, the first radial bearing 21a and the second radial bearing 21b are gas bearings. However, the first radial bearing 21a and the second radial bearing 21b may be any bearings other than gas bearings.

The second through hole 10e is located at a center portion of the end wall 10a and formed through the end wall 10a in the front-rear direction. The second through hole 10e is communicated with the second boss 10d at a front end of the second through hole 10e. The second boss 10d and the second through hole 10e are formed coaxially with the first boss 11c, the first recess 11d, and the first through hole 11e.

The connecting passage 33 is formed through the end wall 10a in the front-rear direction. The connecting passage 33 is communicated with the motor chamber 30. Specifically, the connecting passage 33 is communicated with the rear portion of the motor chamber 30.

The second plate 12 is located in front of the first plate 11. The second plate 12 has a second front surface 12a and a second rear surface 12b respectively on the front side and the rear side of the second plate 12. The second plate 12 is connected to the first plate 11 with the second rear surface 12b contacting the first front surface 11a.

The second plate 12 includes a second recess 12c and a third through hole 12d. The second recess 12c is recessed rearward from the second front surface 12a. A diameter of the second recess 12c is smaller than a diameter of the first recess 11d. A front end of the second recess 12c is communicated with an impeller chamber 27a, which is described later. A third seal ring 25 made of metal is disposed inside the second recess 12c.

The third through hole 12d is located at a center portion of the second plate 12 and formed through the second plate 12 in the front-rear direction. A front end of the third through hole 12d is communicated with the second recess 12c, and a rear end of the third through hole 12d is communicated with the first recess 11d. The second recess 12c and the third through hole 12d are formed coaxially with the first boss 11c, the first recess 11d, and the first through hole 11e.

The first boss 11c, the first recess 11d, the first through hole 11e, the second recess 12c, and the third through hole 12d cooperate to form a first shaft hole 35. The first shaft hole 35 is located between the impeller chamber 27a and the motor chamber 30 in the housing 1, and communicated with the impeller chamber 27a and the motor chamber 30.

The third plate 13 is located behind the motor housing 10. The third plate 13 has a third front surface 13a and a third rear surface 13b respectively on the front side and the rear side of the third plate 13. The third plate 13 is connected to the motor housing 10 with the third front surface 13a contacting the second surface 102 of the end wall 10a.

The third plate 13 has a fourth through hole 13c, a water discharge passage 13d, and a plate connecting passage 13e. The fourth through hole 13c is located at a center portion of the third plate 13 in the front-rear direction. The fourth through hole 13c is formed coaxially with the second through hole 10e.

As illustrated in FIG. 2, the fourth through hole 13c has a first hole portion 131 and a second hole portion 132. The first hole portion 131 forms the front portion of the fourth through hole 13c. The first hole portion 131 has the same diameter as the second through hole 10e has, and is communicated with the second through hole 10e. The second hole portion 132 is located behind the first hole portion 131 and forms the rear portion of the fourth through hole 13c. The second hole portion 132 is formed coaxially with the first hole portion 131, and a diameter of the second hole portion 132 is smaller than a diameter of the first hole portion 131. The second hole portion 132 is communicated with a turbine chamber 29a, which is described later. The fourth through hole 13c is located between the second through hole 10e and the turbine chamber 29a and communicated with the second through hole 10e and the turbine chamber 29a.

The second boss 10d, the second through hole 10e, and the fourth through hole 13c cooperate to form a second shaft hole 37. The second shaft hole 37 is located between the motor chamber 30 and the turbine chamber 29a in the housing 1, and communicated with the motor chamber 30 and the turbine chamber 29a.

The water discharge passage 13d is communicated with the first hole portion 131, extends through the third plate 13 in the radial direction of the housing 1, and is opened on an outer peripheral surface 130 of the third plate 13. The second shaft hole 37 is communicated with the outside of the housing 1 through the water discharge passage 13d.

The plate connecting passage 13e extends frontward through the third plate 13, and a rear end of the plate connecting passage 13e is connected to the water discharge passage 13d. Further, a front end of the plate connecting passage 13e is opened on the third front surface 13a of the third plate 13. Since the third plate 13 is connected to the motor housing 10, the plate connecting passage 13e is connected to the connecting passage 33. Accordingly, the connecting passage 33 is communicated with the water discharge passage 13d through the plate connecting passage 13e.

As illustrated in FIG. 1, the compressor housing 14 is located in front of the second plate 12. The compressor housing 14 has a cylindrical shape, and is connected to the second plate 12 while contacting the second front surface 12a of the second plate 12. The compressor housing 14 forms a front end portion of the housing 1.

The compressor housing 14 has a first inlet 14a and a first outlet 14b. The first inlet 14a is formed coaxially with the first shaft hole 35, and extends through the compressor housing 14 in the front-rear direction. A front end of the first inlet 14a is opened on a front surface 140 of the compressor housing 14. The first outlet 14b extends through the compressor housing 14 in the radial direction, and is opened on an outer peripheral surface 141 of the compressor housing 14.

The impeller chamber 27a, the discharge chamber 27b, and a first diffuser passage 27c are formed between the compressor housing 14 and the second front surface 12a. The impeller chamber 27a is communicated with the first inlet 14a. The discharge chamber 27b extends about the axis of the first inlet 14a around the impeller chamber 27a. The discharge chamber 27b is communicated with the first outlet 14b. The impeller chamber 27a is communicated with the discharge chamber 27b through the first diffuser passage 27c. The impeller chamber 27a is communicated with the first outlet 14b through the first diffuser passage 27c and the discharge chamber 27b.

The turbine housing 15 is located behind the third plate 13. The turbine housing 15 has a cylindrical shape, and is connected to the third plate 13 while contacting the third rear surface 13b of the third plate 13. The turbine housing 15 forms a rear end portion of the housing 1.

The turbine housing 15 has a second inlet 15a and a second outlet 15b. The second inlet 15a extends through the turbine housing 15 in the radial direction, and is opened on an outer peripheral surface 151 of the turbine housing 15. The second outlet 15b is formed coaxially with the second shaft hole 37, and extends through the turbine housing 15 in the front-rear direction. A rear end of the second outlet 15b is opened on a rear surface 150 of the turbine housing 15.

The turbine chamber 29a, a suction chamber 29b, and a second diffuser passage 29c are formed between the turbine housing 15 and the third rear surface 13b. The turbine chamber 29a is communicated with the second outlet 15b. The suction chamber 29b extends about the axis of the second outlet 15b around the turbine chamber 29a. The suction chamber 29b is communicated with the second inlet 15a. The turbine chamber 29a is communicated with the suction chamber 29b through the second diffuser passage 29c. The turbine chamber 29a is communicated with the second inlet 15a through the second diffuser passage 29c and the suction chamber 29b.

In the housing 1, the impeller chamber 27a is located away from the turbine chamber 29a in the front-rear direction, and the motor chamber 30 is located between the impeller chamber 27a and the turbine chamber 29a.

The first inlet 14a is connected to a pipe 41. Cathode gas containing oxygen is introduced from the outside of the housing 1 into the first inlet 14a through the pipe 41. Furthermore, the first outlet 14b is connected to one end of a pipe 43. The other end of the pipe 43 is connected to the fuel cell 300. Accordingly, the discharge chamber 27b is connected to the fuel cell 300. The pipe 43 is connected to one end of the pipe 45. The other end of the pipe 45 is connected to the supply passage 31. The pipe 45 is provided with an intercooler 400. The intercooler 400 is available in the market.

The fuel cell 300 is connected to one end of a pipe 47. The other end of the pipe 47 is connected to the second inlet 15a. Accordingly, the fuel cell 300 is connected to the suction chamber 29b. The second outlet 15b is connected to a pipe 49.

The electric motor 3 is accommodated in the motor chamber 30. The electric motor 3 includes a stator 3a and a rotor 3b. The stator 3a has a cylindrical shape, extends in the front-rear direction, and is fixed to an inner peripheral surface 104 of the peripheral wall 10b. The stator 3a is connected to a power supply unit (not illustrated) that is disposed outside the housing 1. The rotor 3b has a cylindrical shape and extends in the front-rear direction, and a diameter of the rotor 3b is smaller than a diameter of the stator 3a. The rotor 3b is disposed in the stator 3a.

The drive shaft 5 includes a drive shaft body 51 and a seal carrier 53. The drive shaft body 51 is made of metal. The drive shaft body 51 has a solid cylindrical shape and extends in the front-rear direction. The drive shaft body 51 has a first shaft portion 51a, a second shaft portion 51b, a third shaft portion 51c, and a fourth shaft portion 51d that are arranged from front to rear in this order. The first shaft portion 51*a*, the second shaft portion 51*b*, the third shaft portion 51*c*, and the fourth shaft portion 51*d* are formed coaxially with each other.

The first shaft portion 51*a* has the same diameter as the fourth shaft portion 51*d* has. Specifically, the first shaft portion 51*a* and the fourth shaft portion 51*d* have a diameter having a first length L1 (see FIG. 2), which is the smallest diameter of the drive shaft body 51. As illustrated in FIG. 1, the second shaft portion 51*b* has a diameter that is larger than the diameters of the first shaft portion 51*a* and the fourth shaft portion 51*d*. A front end of the second shaft portion 51*b* is connected to the first shaft portion 51*a*. Specifically, the second shaft portion 51*b* has a diameter having a second length L2, which is larger than the first length L1 of the diameters of the first shaft portion 51*a* and the fourth shaft portion 51*d* (see FIG. 2). The third shaft portion 51*c* has a diameter having a third length L3 that is larger than the second length L2 of the diameter of the second shaft portion 51*b*. The diameter of the third shaft portion 51*c* is the largest diameter of the drive shaft body 51. As illustrated in FIG. 1, a front end and a rear end of the third shaft portion 51*c* are respectively connected to the second shaft portion 51*b* and the fourth shaft portion 51*d*.

As illustrated in FIG. 2, the seal carrier 53 is made of metal and has a cylindrical shape. The seal carrier 53 is fixed to the fourth shaft portion 51*d* by press-fitting. The seal carrier 53 is in contact with the rear end of the third shaft portion 51*c*. Accordingly, the seal carrier 53 is integral with the drive shaft body 51.

The seal carrier 53 has a first diameter portion 53*a*, a second diameter portion 53*b*, and a step portion 53*c*. The first diameter portion 53*a*, the second diameter portion 53*b*, and the step portion 53*c* are formed coaxially with each other. The first diameter portion 53*a*, the second diameter portion 53*b*, and the step portion 53*c* are formed coaxially with the drive shaft body 51 since the seal carrier 53 is fixed to the fourth shaft portion 51*d*.

The first diameter portion 53*a* forms a front portion of the seal carrier 53. The first diameter portion 53*a* has the same diameter as the third shaft portion 51*c* of the drive shaft body 51 has, that is, the first diameter portion 53*a* has a diameter having the third length L3. Accordingly, the diameters of the first diameter portion 53*a* and the third shaft portion 51*c* are the largest diameter of the drive shaft 5. The first diameter portion 53*a* has a first ring groove 55*a* in an outer peripheral surface of the first diameter portion 53*a*.

The second diameter portion 53*b* forms a rear portion of the seal carrier 53, and is located between the first diameter portion 53*a* and the turbine chamber 29*a* in the axial direction. A diameter of the second diameter portion 53*b* is smaller than the diameter of the first diameter portion 53*a*. The second diameter portion 53*b* has the same diameter as the second shaft portion 51*b* of the drive shaft body 51 has, in other words, the second diameter portion 53*b* has a diameter having the second length L2. The second diameter portion 53*b* has a second ring groove 55*b* in an outer peripheral surface of the second diameter portion 53*b*.

The third length L3 is smaller than a length of an inner diameter of the first hole portion 131 of the fourth through hole 13*c*, and larger than a length of an inner diameter of the second hole portion 132. The second length L2 is smaller than a length of the inner diameter of the second hole portion 132. Accordingly, the diameters of the third shaft portion 51*c* and the first diameter portion 53*a* are smaller than the diameter of the first hole portion 131, and larger than the diameter of the second hole portion 132. The diameter of the second diameter portion 53*b* is smaller than the diameter of the second hole portion 132.

The step portion 53*c* is located between the first diameter portion 53*a* and the second diameter portion 53*b*. The step portion 53*c* extends in a radial direction of the seal carrier 53, and is continuous with the first diameter portion 53*a* and the second diameter portion 53*b*.

As illustrated in FIG. 1, the drive shaft 5 is disposed in the housing 1 and inserted through the first shaft hole 35 and the second shaft hole 37. In the motor chamber 30, the third shaft portion 51*c* of the drive shaft body 51 of the drive shaft 5 is inserted through and fixed to the rotor 3*b*. The third shaft portion 51*c* is inserted through the first radial bearing 21*a* in the first boss 11*c*, and further inserted through the second radial bearing 21*b* in the second boss 10*d*. The drive shaft 5 is rotatable about an axis O of the drive shaft 5. The axis O extends in parallel to the front-rear direction of the turbo fluid machine.

The first shaft portion 51*a* of the drive shaft body 51 of the drive shaft 5 extends into the impeller chamber 27*a*. The second shaft portion 51*b* is inserted through the third seal ring 25 in the second recess 12*c*. The third seal ring 25 is disposed between the first shaft hole 35 and the drive shaft 5 so as to seal a gap between the impeller chamber 27*a* and the motor chamber 30. In the first recess 11*d*, the second shaft portion 51*b* is inserted through the first thrust bearing 23*a* and the second thrust bearing 23*b*, and press-fitted in a support plate 57. The support plate 57 is disposed between the first thrust bearing 23*a* and the second thrust bearing 23*b*. Accordingly, the support plate 57 cooperates with the second rear surface 12*b* of the second plate 12 to hold therebetween the first thrust bearing 23*a* in the front-rear direction, and cooperates with a wall surface of the first recess 11*d* to hold therebetween the second thrust bearing 23*b* in the front-rear direction.

As illustrated in FIG. 1, the fourth shaft portion 51*d* of the drive shaft body 51 of the drive shaft 5 extends into the turbine chamber 29*a*. The rear end of the third shaft portion 51*c* and the seal carrier 53 are located in the fourth through hole 13*c*. Specifically, the rear end of the third shaft portion 51*c* and the first diameter portion 53*a* of the seal carrier 53 are located in the first hole portion 131 of the fourth through hole 13*c*, and the second diameter portion 53*b* of the seal carrier 53 is located in the second hole portion 132.

The impeller 7 is accommodated in the impeller chamber 27*a*. The impeller 7 is fixed to the first shaft portion 51*a* of the drive shaft body 51 of the drive shaft 5. The turbine 9 is accommodated in the turbine chamber 29*a*. The turbine 9 is fixed to the fourth shaft portion 51*d* of the drive shaft body 51. The drive shaft 5 connects the electric motor 3, the impeller 7, and the turbine 9. The impeller 7 rotates about the axis O of the drive shaft 5 in the impeller chamber 27*a* with the rotation of the drive shaft 5 about the axis O of the drive shaft 5. Similarly, the turbine 9 rotates about the axis O of the drive shaft 5 in the turbine chamber 29*a* with the rotation of the drive shaft 5 about the axis O of the drive shaft 5.

The first seal ring 61 and the second seal ring 63 are made of metal. As illustrated in FIG. 2, a diameter of the second seal ring 63 is smaller than a diameter of the first seal ring 61. The first seal ring 61 is held in the first ring groove 55*a*, and disposed in the first diameter portion 53*a* of the seal carrier 53. The second seal ring 63 is held in the second ring groove 55*b*, and disposed in the second diameter portion 53*b* of the seal carrier 53. Accordingly, the first seal ring 61 is located away from the second seal ring 63 in the seal carrier 53, i.e., the drive shaft 5 in the front-rear direction. Specifically, the second seal ring 63 is located behind the first seal ring 61.

The first seal ring 61 and the second seal ring 63 are located in the fourth through hole 13c with the seal carrier 53 since the seal carrier 53 is located in the fourth through hole 13c. The first seal ring 61 is located between the first hole portion 131 and the first diameter portion 53a. The second seal ring 63 is located between the second hole portion 132 and the second diameter portion 53b. The first seal ring 61 and the second seal ring 63 are disposed between the second shaft hole 37 and the drive shaft 5 to seal a gap between the motor chamber 30 and the turbine chamber 29a.

The seal carrier 53 (i.e., the drive shaft 5), an inner peripheral surface of the first hole portion 131 and an inner peripheral surface of the second hole portion 132 (i.e., the second shaft hole 37), the first seal ring 61, and the second seal ring 63 cooperate to form a first reservoir S1 in the second shaft hole 37. The first reservoir S1 serves as the reservoir of the present disclosure as an example. The first reservoir S1 is communicated with the water discharge passage 13d. The first reservoir S1 is sealed off from the motor chamber 30 by the first seal ring 61, and also from the turbine chamber 29a by the second seal ring 63.

The fuel cell 300 illustrated in FIG. 1 is available in the market, and includes a plurality of fuel cells. The fuel cell 300 generates power by a chemical reaction of cathode gas with anode gas.

In this turbo fluid machine, power is supplied from the power supply unit to the electric motor 3 to operate the electric motor 3, and the drive shaft 5 rotates about the axis O of the drive shaft 5. Thus, the impeller 7 rotates about the axis O of the drive shaft 5 in the impeller chamber 27a.

With the rotation of the electric motor 3, the impeller 7 compresses the cathode gas introduced into the impeller chamber 27a from the first inlet 14a. The cathode gas compressed by the impeller 7 is discharged to the pipe 43 from the first outlet 14b. The cathode gas then flows through the pipe 43, and is supplied to the fuel cell 300. The fuel cell 300 thus generates power.

Part of the cathode gas flows from the pipe 43 into the pipe 45 and is cooled by the intercooler 400, and the cathode gas is then supplied to the motor chamber 30 through the supply passage 31. Accordingly, the pressure in the motor chamber 30 becomes higher than the pressure in the first reservoir S1 and the pressure in the turbine chamber 29a.

The exhaust containing the cathode gas used in the power generation is discharged from the fuel cell 300, and introduced into the turbine chamber 29a through the pipe 47, the second inlet 15a, and the suction chamber 29b. The exhaust from the fuel cell 300 rotates the turbine 9 about the axis O of the drive shaft 5 in the turbine chamber 29a. Accordingly, the turbine 9 assists the electric motor 3 to cause the drive shaft 5 to rotate about the axis O. The exhaust introduced into the turbine chamber 29a has a pressure lower than a pressure of the cathode gas in the pipe 43, i.e., a pressure of the cathode gas compressed by the impeller 7. The exhaust introduced into the turbine chamber 29a is discharged, by the turbine 9 rotating about the axis O of the drive shaft 5, to the outside of the housing 1 through the second outlet 15b and the pipe 49.

The exhaust from the fuel cell 300 contains water produced during the power generation by the fuel cell 300. The produced water is discharged with the exhaust from the second outlet 15b into the pipe 49, but part of the produced water may be stored in the turbine chamber 29a.

In this turbo fluid machine, the seal carrier 53 has the first seal ring 61 and the second seal ring 63, and the second seal ring 63 is located behind the first seal ring 61, that is, the second seal ring 63 is located away from the first seal ring 61 and between the first seal ring 61 and the turbine chamber 29a.

This configuration of the turbo fluid machine prevents the produced water from directly flowing into the motor chamber 30 and stores the water in the first reservoir S1, even if the water flows through a gap between the second hole portion 132 of the fourth through hole 13c and the second seal ring 63 from the turbine chamber 29a as indicated by a dashed arrow in FIG. 2. If the water is to flow from the first reservoir S1 toward the motor chamber 30, the water needs to flow over the step portion 53c and through a gap between the first hole portion 131 of the fourth through hole 13c and the first seal ring 61. Accordingly, the water is unlikely to flow into the motor chamber 30 from the first reservoir S1. Furthermore, the pressure in the motor chamber 30 is higher than the pressure in the first reservoir S1 and the pressure in the turbine chamber 29a since part of the cathode gas compressed by the impeller 7 is supplied to the motor chamber 30 through the supply passage 31. Accordingly, the water is further unlikely to flow into the motor chamber 30 from the first reservoir S1.

The produced water in the first reservoir S1 is discharged to the outside of the third plate 13, i.e., the outside of the housing 1, through the water discharge passage 13d. Accordingly, this turbo fluid machine suitably prevents the produced water from flowing into the motor chamber 30 from the turbine chamber 29a through the second shaft hole 37.

Therefore, the turbo fluid machine according to the first embodiment is capable of suitably preventing short circuit in the electric motor 3 due to the water contained the exhaust from the fuel cell 300.

Particularly, this turbo fluid machine has the connecting passage 33 in the end wall 10a of the motor housing 10, and the connecting passage 33 is communicated with the water discharge passage 13d through the plate connecting passage 13e of the third plate 13. Accordingly, even if the water flows through the gap between the first hole portion 131 of the fourth through hole 13c and the first seal ring 61 and flows into the motor chamber 30 through the second through hole 10e and the second boss 10d, the water is discharged easily to the outside of the housing 1 from the motor chamber 30 through the connecting passage 33, the plate connecting passage 13e, and the water discharge passage 13d by the pressure difference between the inside of the motor chamber 30 and the outside of the housing 1 without reaching the electric motor 3 (as indicated by the dashed arrow in FIG. 2). In this regard, this turbo fluid machine also suitably prevents short circuit in the electric motor 3 due to the produced water contained in the cathode gas.

Second Embodiment

As illustrated in FIG. 3, in the turbo fluid machine according to a second embodiment, the seal carrier 53 (i.e., the drive shaft 5), the inner peripheral surface of the first hole portion 131 and the inner peripheral surface of the second hole portion 132 (i.e., the second shaft hole 37), the first seal ring 61, and the second seal ring 63 cooperate to form a second reservoir S2. The second reservoir S2 serves as the reservoir of the present disclosure as an example.

The second reservoir S2 includes a reservoir body S21 and a groove S22. The reservoir body S21 has a size equal to the size of the first reservoir S1 of the turbo fluid machine according to the first embodiment, and the reservoir body S21 is sealed off from the motor chamber 30 by the first seal ring 61 and also from the turbine chamber 29a by the second seal ring 63.

The groove S22 is formed in the first hole portion 131 (i.e., the second shaft hole 37). The groove S22 is located below the axis O in the first hole portion 131, and rectangularly recessed downward from the inner peripheral surface of the first hole portion 131 in the radial direction of the drive shaft 5. That is, the groove S22 is recessed in a direction in which the gravity acts on the turbo fluid machine with the turbo fluid machine mounted to the fuel cell vehicle. The groove S22 faces the reservoir body S21 and is communicated with the reservoir body S21. The groove S22 is further communicated with the water discharge passage 13d. The groove S22 may be formed in the inner peripheral surface of the first hole portion 131 and extend in a circumferential direction of the drive shaft 5 so as to have a ring shape. It is to be noted that, other components of the turbo fluid machine according to the second embodiment are the same as those of the turbo fluid machine according to the first embodiment, and components of the turbo fluid machine according to the second embodiment that correspond to those of the turbo fluid machine according to the first embodiment are designated by the same reference numerals and will not be further elaborated here.

In this turbo fluid machine, even if the water flows from the turbine chamber 29a into the second reservoir S2 through the gap between the second hole portion 132 of the fourth through hole 13c and the second seal ring 63, the water flows from the reservoir body S21 of the second reservoir S2 to the groove S22 by the gravity acting on the housing 1, and is stored in the groove S22. The water stored in the groove S22 is then discharged to the outside of the housing 1 through the water discharge passage 13d.

Since the second reservoir S2 includes the reservoir body S21 and the groove S22, the second reservoir S2 of this turbo fluid machine is capable of storing a large amount of produced water. This configuration suppresses the overflow of the water from the second reservoir S2 even if a large amount of the water flows into the second reservoir S2 from the turbine chamber 29a. Further, the water is stored in the groove S22, so that the water is unlikely to flow through the gap between the first hole portion 131 and the first seal ring 61. Accordingly, in this turbo fluid machine, the water in the second reservoir S2 is unlikely to flow into the motor chamber 30. Other advantageous effects of this turbo fluid machine are the same as those of the turbo fluid machine according to the first embodiment.

Although the present disclosure has been described by the first and second embodiments, the present disclosure is not limited to those embodiments, and may be modified within the scope of the present disclosure.

For example, according to the first embodiment and the second embodiment, the drive shaft 5 of the turbo fluid machine includes the drive shaft body 51 and the seal carrier 53. However, the configuration of the drive shaft 5 is not limited thereto. The drive shaft 5 may only include the drive shaft body 51, and the third shaft portion 51c and the fourth shaft portion 51d may be provided with the first seal ring 61 and the second seal ring 63, respectively.

According to the first embodiment and the second embodiment, in the turbo fluid machine, the diameter of the second seal ring 63 is smaller than the diameter of the first seal ring 61, but the configurations of the first seal ring 61 and the second seal ring 63 are not limited thereto. The diameter of the second seal ring 63 may be equal to the diameter of the first seal ring 61.

Furthermore, the gap between the motor chamber 30 and the turbine chamber 29a may be sealed by any sealing member, such as other seal ring, in addition to the first seal ring 61 and the second seal ring 63.

The supply passage 31, the connecting passage 33, and the plate connecting passage 13e may be omitted.

According to the first embodiment and the second embodiment, the water discharge passage 13d of the turbo fluid machine is opened on the outer peripheral surface 130 of the third plate 13. However, the configuration of the water discharge passage 13d is not limited thereto. The water discharge passage 13d may be opened to the second outlet 15b so as to be communicated with the outside of the housing 1. In this configuration, the produced water flows through the water discharge passage 13d, and is discharged from the second outlet 15b to the outside of the housing 1.

The present disclosure is applicable to a fuel cell vehicle, a fuel cell system, and the like.

What is claimed is:

1. A turbo fluid machine comprising:
a housing having an impeller chamber, a turbine chamber, a motor chamber located between the impeller chamber and the turbine chamber, a first shaft hole located between the impeller chamber and the motor chamber and communicated with the impeller chamber and the motor chamber, and a second shaft hole located between the motor chamber and the turbine chamber and communicated with the motor chamber and the turbine chamber;
an electric motor accommodated in the motor chamber;
an impeller accommodated in the impeller chamber, and configured to compress a cathode gas with rotation of the electric motor so as to supply the cathode gas to a fuel cell;
a turbine accommodated in the turbine chamber and rotated by exhaust from the fuel cell;
a drive shaft inserted through the first shaft hole and the second shaft hole, and connecting the electric motor, the impeller, and the turbine; and
a sealing member disposed between the second shaft hole and the drive shaft to seal a gap between the motor chamber and the turbine chamber, wherein
the sealing member includes a first sealing member and a second sealing member that is located away from the first sealing member and between the first sealing member and the turbine chamber in an axial direction of the drive shaft,
the drive shaft, the second shaft hole, the first sealing member, and the second sealing member cooperate to form a reservoir in which water contained in the exhaust is stored,
the housing has a water discharge passage which is communicated with the reservoir and through which the water is discharged from the reservoir to an outside of the housing, and
the first sealing member and the second sealing member each contact a wall of the second shaft hole.

2. The turbo fluid machine according to claim 1, wherein the drive shaft has a first diameter portion, a second diameter portion, and a step portion, wherein the second diameter portion is formed coaxially with the first diameter portion and located between the first diameter portion and the turbine chamber in the axial direction, and a diameter of the second diameter portion is smaller than a diameter of the first diameter portion, wherein the step portion is formed coaxially with the first diameter portion and the second diameter portion and located between the first diameter portion and the second diameter portion, and the first sealing member is disposed in the first diameter portion, and the second sealing member is disposed in the second diameter portion, and a diameter of the second sealing member is smaller than a diameter of the first sealing member.

3. The turbo fluid machine according to claim 1, wherein the reservoir includes a groove that is formed in the second shaft hole and recessed in a direction in which the gravity acts.

4. The turbo fluid machine according to claim 1, wherein the housing has a supply passage through which part of the cathode gas compressed by the impeller is supplied to the motor chamber, and a connecting passage connected to the motor chamber and the water discharge passage.

5. The turbo fluid machine according to claim 1, wherein the first seal and second seal are each discrete individual seals separate from one another.

6. The turbo fluid machine according to claim 3, wherein the groove has a larger diameter than a diameter of the water discharge passage.

7. The turbo fluid machine according to claim 4, wherein the connecting passage is internally arranged within the housing.

8. A turbo fluid machine comprising:
a housing having an impeller chamber, a turbine chamber, a motor chamber located between the impeller chamber and the turbine chamber, a first shaft hole located between the impeller chamber and the motor chamber and communicated with the impeller chamber and the motor chamber, and a second shaft hole located between the motor chamber and the turbine chamber and communicated with the motor chamber and the turbine chamber;

an electric motor accommodated in the motor chamber;
an impeller accommodated in the impeller chamber, and configured to compress a cathode gas with rotation of the electric motor so as to supply the cathode gas to a fuel cell;
a turbine accommodated in the turbine chamber and rotated by exhaust from the fuel cell;
a drive shaft inserted through the first shaft hole and the second shaft hole, and connecting the electric motor, the impeller, and the turbine; and
a sealing member disposed between the second shaft hole and the drive shaft to seal a gap between the motor chamber and the turbine chamber, wherein
the sealing member includes a first sealing member and a second sealing member that is located away from the first sealing member and between the first sealing member and the turbine chamber in an axial direction of the drive shaft,
the drive shaft, the second shaft hole, the first sealing member, and the second sealing member cooperate to form a reservoir in which water contained in the exhaust is stored, and
the housing has a water discharge passage which is communicated with the reservoir and through which the water is discharged from the reservoir to an outside of the housing,
wherein the drive shaft further comprises a seal carrier arranged on a portion of the drive shaft,
wherein the first sealing member is disposed in a first diameter portion of the seal carrier, and the second sealing member is disposed in a second diameter portion of the seal carrier, and
wherein the seal carrier, the second shaft hole, the first sealing member, and the second sealing member cooperate to form the reservoir.

* * * * *